United States Patent [19]

Stephens

[11] 3,930,230

[45] Dec. 30, 1975

[54] PATTERN ANALYSIS METHOD AND APPARATUS

[76] Inventor: Richard G. Stephens, 318 Security Mutual Life Bldg., Binghamton, N.Y. 13901

[22] Filed: Feb. 25, 1974

[21] Appl. No.: 445,340

[52] U.S. Cl. ................340/146.3 AG; 340/146.3 D; 235/92 PC

[51] Int. Cl.² ............................................ G06K 9/12

[58] Field of Search......... 340/146.3 AG, 146.3 AE, 340/146.3 Y, 146.3 D, 146.3 R; 235/92 PC; 178/7.6; 356/103, 104, 71; 324/71 CP

[56] References Cited

UNITED STATES PATENTS

| | | | |
|---|---|---|---|
| 3,582,887 | 6/1971 | Guthrie | 340/146.3 AG |
| 3,705,383 | 12/1972 | Frayer | 340/146.3 R |
| 3,780,223 | 12/1973 | Perry | 235/92 PC |
| 3,781,467 | 12/1973 | Soames | 235/92 PC |
| 3,790,760 | 2/1974 | Stiller | 235/92 PC |
| 3,790,883 | 2/1974 | Bergegere | 324/71 CP |
| 3,803,553 | 4/1974 | Nakano et al. | 340/146.3 D |
| 3,811,036 | 5/1974 | Perry | 235/92 PC |

*Primary Examiner*—Joseph M. Thesz, Jr.

[57] ABSTRACT

Objects such as biological samples viewed through a microscope are optically scanned to derive video signals varying as a function of the optical density of the sample, the video signals are differentiated to provide density gradient signals, and portions of the density gradient signals falling within a plurality of different ranges of density gradients are accumulated over the scan field to provide output data values, such as digital pulse counts, characteristic of the scanned object. Further data is obtained by scanning the pattern with successive geometrically differing scanning fields and similarly accumulating portions of the density gradient signals which fall within various ranges. Still further data is obtained by detecting the areas of the scan field which have densities falling within respective density ranges and providing stored output data indicating how much of each of those areas has a density gradient falling within one or more selected ranges of density gradients. A further embodiment processes the video signals by applying them through a network having a variable transfer-function to provide a plurality of further signals and the portions of each of the further signals which fall within each of a group of ranges are accumulated for each range to provide further data values which are characteristic of the object scanned.

20 Claims, 8 Drawing Figures

Figure 1:
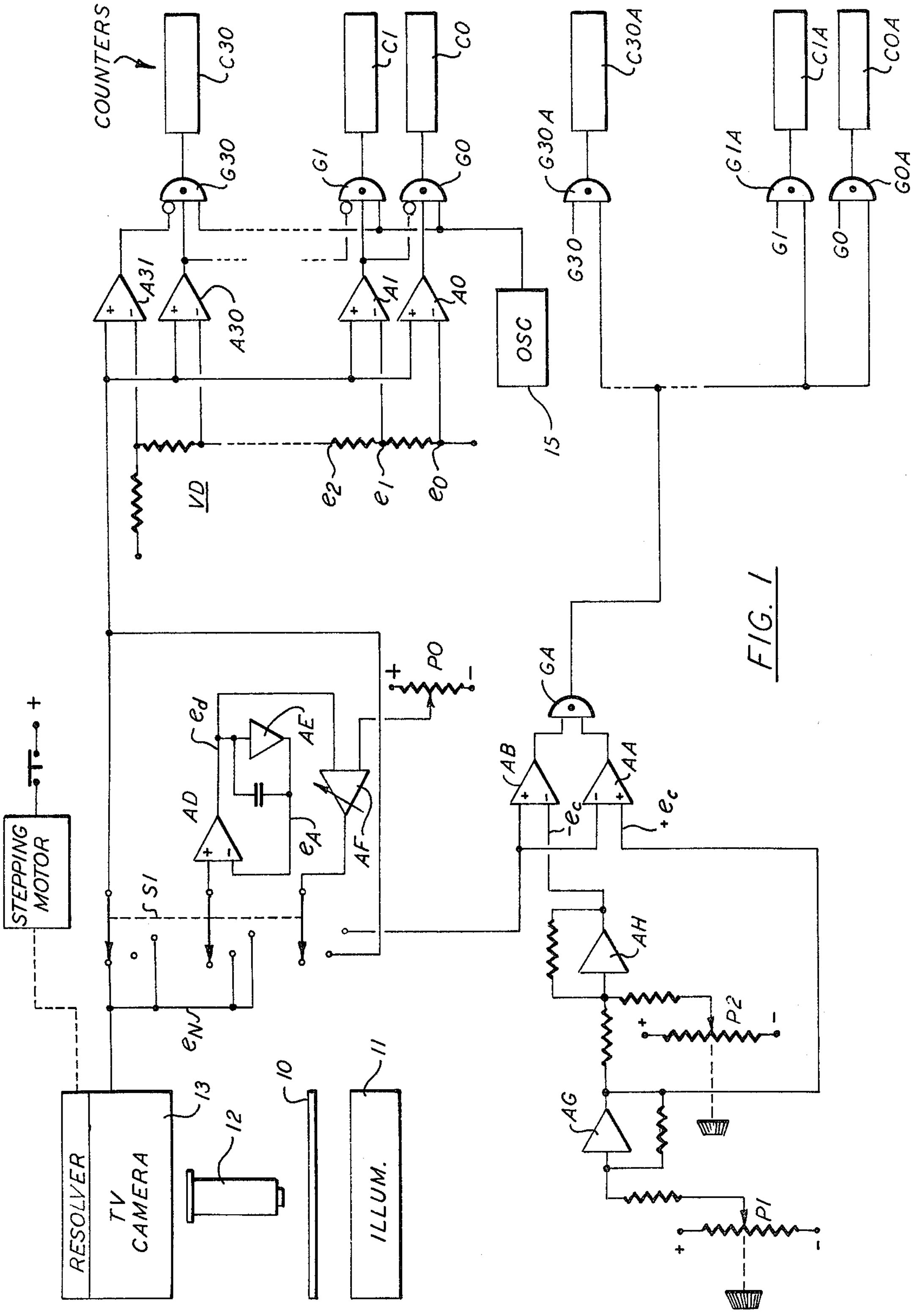

| | $V_1$ | $V_2$ | $V_3$ | $V_4$ | $V_5$ |
|---|---|---|---|---|---|
| $H_1$ | 1 | 2 | 3 | 3 | 2 |
| $H_2$ | 2 | 3 | 4 | 4 | 3 |
| $H_3$ | 1 | 3 | 2 | 1 | 2 |
| $H_4$ | 1 | 1 | 1 | 1 | 1 |
| $H_5$ | 1 | 1 | 1 | 1 | 1 |
FIG. 2a
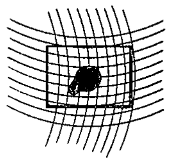
FIG. 3a
| | | | | | |
|---|---|---|---|---|---|
| +1 | +1 | +1 | 0 | -1 | -2 |
| +2 | +1 | +1 | 0 | -1 | -3 |
| +1 | +2 | -1 | -1 | +1 | -2 |
| +1 | 0 | 0 | 0 | 0 | -1 |
| +1 | 0 | 0 | 0 | 0 | -1 |
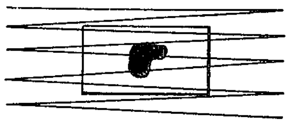
FIG. 3b
FIG. 2b
| | | | | |
|---|---|---|---|---|
| +1 | +2 | +3 | +3 | +2 |
| +1 | +1 | +1 | +1 | +1 |
| -1 | 0 | -2 | -3 | -1 |
| 0 | -2 | -1 | 0 | -1 |
| 0 | 0 | 0 | 0 | 0 |
| -1 | -1 | -1 | -1 | -1 |
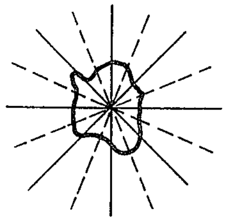
FIG. 3c
FIG. 2c

PATTERN ANALYSIS METHOD AND APPARATUS

This invention relates to pattern analysis method and apparatus. Method and apparatus are known for scanning various types of complex patterns (such as blood cells, for example) comprising elemental areas having many different optical densities, and for recording the optical density of each elemental areas. In order to detect minute pattern features, high scanning resolution must be used, so that the pattern is divided into a large number (e.g. thousands) of elemental areas, and in order that subtle changes in density be noted, a fairly large number (e.g. 255) different ranges of optical density are often desirably detected. Detecting and recording the spatial coordinates and density of thousands of elemental areas requires extensive computer storage and provides a large mass of data to characterize a pattern, such as leukocyte or other biological sample, and while such a mass of data can be processed by a digital computer to classify the pattern, complex programming and much computer time are required. Prior U.S. Pat. No. 3,705,383 overcomes this problem to some extent by separately accumulating video signals for each density range as a pattern is scanned, ignoring the spatial locations of each elemental area, thereby providing, upon completion of the scanning of the pattern, a group of histogram values indicating the frequencies of occurrence of elemental areas falling within the different density ranges. Ignoring spatial coordinates of elemental areas by not recording them greatly lessens the amount of storage required. Thus if 255 density ranges are used, the pattern is characterized by 255 numbers. This smaller set of numbers can be processed in various ways, using much less computer time or equipment than systems prior to it, to analyze and classify the pattern which was named. While the system of U.S. Pat. No. 3,705,383 can greatly reduce the amount of output data used to characterize the pattern, it does so at the expense of ignoring a large part of the information contained in the pattern. To better distinguish or discriminate between different classes of patterns, such as between different types of blood cells, for example, it is desirable that somewhat more data descriptive of the pattern be available for processing, but desirable that it be made available without reverting to the first-mentioned type of system wherein far too much data, for practical on-line or real-time processing purposes, was obtained, and a primary object of the present invention is to provide pattern analysis method and apparatus wherein useful data in addition to that provided by the system of U.S. Pat. No. 3,705,383 may be obtained at low added cost, or data different than that obtained by the prior patented system may be obtained.

The amount of data which it is desirable to provide to characterize the scanned item depends largely upon the nature of the item to be scanned, and upon how closely the scanned item must be found to resemble or differ from other items of a class. For example, a set of data sufficient to distinguish a scanned item from one set of known items may be insufficient to allow the item to be distinguished from a larger set of known items. By wholly ignoring the spatial distribution of the elemental areas of the pattern which it scans, the system of U.S. Pat. No. 3,705,383 may be deemed for some purposes to make too severe a reduction, in a step-like fashion, in the amount of available data. In order that a given piece of equipment be useful for varied applications, it is desirable that one be able to vary the amount of data which is produced to suit the analysis task at hand, and another object of the invention is to provide improved method and apparatus which may provide different amounts of data, in gradual increases, as gradually more difficult analysis tasks are encountered.

In accordance with one aspect of the present invention, further data characteristics of the pattern may be obtained by modifying the camera video signal in accordance with one or more integro-differential transfer functions to provide modified signals. The portions of the modified signals which lie within each of a plurality of ranges then may be totalized or accumulated to provide the further data. Thus another object of the invention is to provide method and apparatus for providing data characteristic of a pattern having elemental areas of many different densities by totalizing portions of plural waveforms which lie within a plurality of ranges, in which the waveforms are different time functions of an original waveform which varies in accordance with the density of the elemental area being scanned at a given instant.

Because wholly ignoring the spatial locations of the elemental areas of the pattern causes the system of the prior patent to produce a very limited amount of data characteristic of the pattern, another object of the invention is to provide pattern scanning method and apparatus which provides data dependent in some respects upon spatial locations of elemental areas, but which does not require spatial coordinates of any elemental areas to be recorded. This object may be achieved by totalizing portions of plural different waveforms which fall in respective ones of numerous ranges, where the different waveforms are obtained by scanning the pattern in a plurality of different directions, if, in addition, the waveforms vary, at least in part, in accordance with density gradients or rates of change along the scanning lines, as distinguished from density values themselves, and a further object of the present invention is to provide method and apparatus incorporating such a technique.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which:

FIG. 1 is a schematic diagram useful in understanding the operation of several embodiments of the present invention.

FIGS. 2*a*, 2*b* and 2*c* are charts useful in understanding one feature of the present invention.

FIGS. 3*a* to 3*c* are elementary scan line diagrams illustrating several sweep patterns which may be used with various embodiments of the invention.

Figure 4:
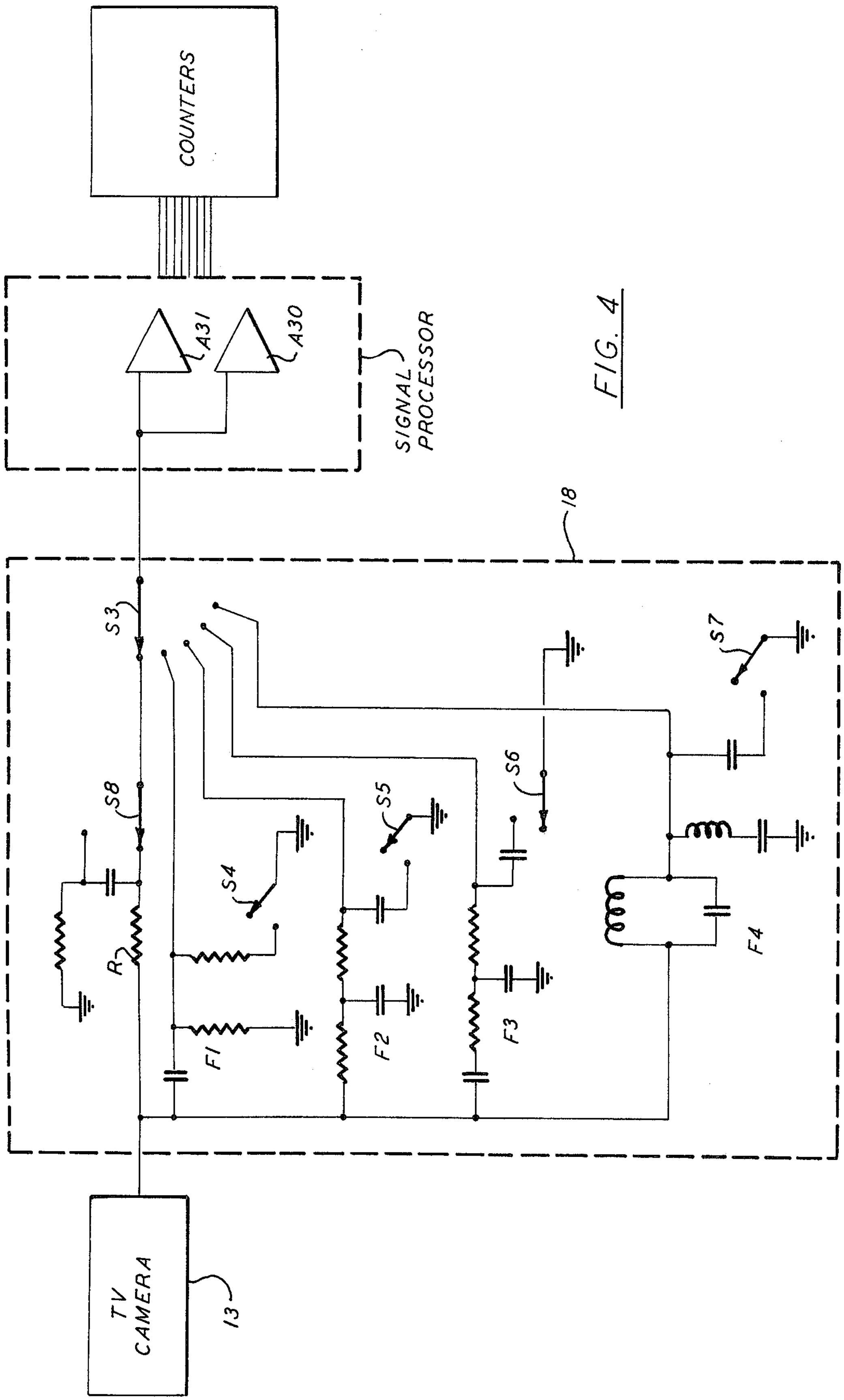

FIG. 4 is a schematic diagram illustrating portions of an alternative embodiment of the invention.

In FIG. 1 a biological sample (not shown) carried on glass slide 10 is illuminated by illuminator 11 and viewed through microscope 12 by a conventional television camera 13. With switch S1 in the position shown, the video signal which occurs while the slide is scanned (and while the camera is unblanked) during one full scanning field is applied to each of a bank of 32 comparator amplifiers of a signal processor, only the first two A0,A1 and last two A30,A31 of which amplifiers are shown. Each comparator amplifier also receives a respective reference voltage from means shown as comprising voltage divider VD. Each comparator amplifier provides a positive output voltage to conditionally enable a respective gate of the group G0 to G31 when the video signal level lies between the levels of a respective pair of terminals of the voltage divider, and each comparator amplifier other than the first one disables the gate associated with the next lower order amplifier. Clock pulses from oscillator 15 are applied to each of the gate. As the video signal level lies between voltages $e_0$ and $e_1$, amplifier A0 routes clock pulses to counter C0. As the video signal lies between voltages $e_1$ and $e_2$, amplifier A1 routes clock pulses to counter C1, and the other comparator-gate-counter channels function in similar fashion. As thus far described the system of FIG. 1 corresponds exactly to prior systems shown in U.S. Pat. No. 3,705,383. At the end of a scanning field the count in each of the counters C0 to C31 represents the total area of the scanned pattern falling within a respective range of optical densities, each range being defined by an adjacent pair of voltages from the voltage divider. At the end of the scanning field the contents of counters C0–C—are read out to a storage or analyzing device (not shown) and their contents comprise the totality of the data which the prior system provides for further analysis.

In accordance with the present invention, data values are instead or in addition accumulated which represent the times during the scanning field in which the time rate of change of the camera video signal lies within each of a group of ranges. With each scan line of the camera progressing across the scan field at a uniform speed, the rate of change of the video signal represents the density gradient of the pattern along the scan line. More precisely, the camera output signal will vary in accordance with the light received by the camera, which ordinarily will vary inversely as a function of the logarithm of the optical density of the elemental area being scanned rather than in accordance with density per se, but for sake of convenience the signal $e_v$ may be deemed to vary with density and the signal $e_d$ to vary in accordance with the density gradient. When switch S1 is moved from the position shown to its mid-position, the video signal from camera 13 during a scanning field is applied indirectly to each of the comparator amplifiers A0 to A31 through a differentiating circuit which includes amplifier AD and integrator amplifier AE. A simple series capacitor-shunt resistor differentiating circuit may be used in some applications. If the gain of amplifier AD is designated A, the output $e_d$ of amplifier AD will be seen to equal $e_d = A\ (e_v - e_A)$. The output of integrator amplifier AE will be seen to be $$e_A = -e_d/p$$

assuming the open-loop gain of amplifier AE is very great, where p is the differential operator. Combining the two above equations provides $$e_d = \frac{Ae_v}{1 - \frac{A}{p}}$$

which, if A is very large compared to unity, can be written as $e_d = -e_v p$ indicating that the voltage $e_d$ is the time derivative of voltage $e_v$. It is desirable that amplifiers AD and AE, and other comparator amplifiers be capable of quick overload recovery, and the voltage swings in such amplifiers may be limited by diodes (not shown), or by using other known techniques. As the description proceeds, it will become apparent that the differentiating circuit need not (and cannot) provide "pure" differentiation with a transfer function of exactly $p$, but can instead provide approximate differentiation with a transfer function $p + k$. The time-constant which should be used depends, of course, upon the line scanning speed which is used, and may vary in different applications.

The derivative voltage $e_d$ is shown applied via an inverting amplifier AF and switch S1 to each of comparator amplifiers A0–A31, in the same manner in which the video signal $e_v$ itself is applied in the prior system. It is not absolutely necessary that inverter AF be used, since the negative value of the derivative can be processed to provide data values equivalent to those provided if the positive value is processed. However, use of the same sign convention for density gradient values as for density values themselves leads to easier understanding. Also, amplifier AF may provide a desired predetermined gain or attenuation, and/or a level-shifting, so that the same reference voltages may be applied to the comparator amplifiers by the voltage divider during processing of the derivative of the video signal as were applied during the processing of the original video signal. It is not necessary, however, that the same set of reference voltages be used, however, and it will be apparent that a set of switches (not shown) may be used to connect voltages to the comparator amplifiers from other taps of the voltage divider. An arrow indicates that amplifier AF may comprise a variable gain amplifier, and a potentiometer PO input signifies that a bias signal may be applied for the purpose of level-shifting. The comparator amplifiers A0–A31, their associated gates and the counters operate the same manner as when the original video signal is applied to the comparators, except, of course, that much different values, with a much different distribution, will be tallied in the counters as the density gradient signal is processed. Thus far it has been assumed that camera 13 is arranged to provide more positive output signals for denser portions of the specimen, but it should be appreciated that the opposite arrangement may be used, if desired.

It should become apparent at this point that rather than timesharing the comparator amplifiers, gates and counters between original video signal processing and derivative signal processing, duplicate banks of comparators, gates and counters may be provided, so that both the original video signal and its time-derivative may be processed simultaneously. Removal of switch S1 and provision of a duplicate set of comparators, gates and counters to receive the AF output signal while the comparators shown receive the original vides signal are such simple changes that further illustration of such a system is not deemed necessary. FIG. 1 does illustrate, however, a further feature which may be used in any embodiment where processing of the original video and the differentiated video occur simultaneously. With switch S1 in its lower position it applied the original video simultaneously to the comparator amplifiers A0 to A31, and to the differentiating circuit AD,AE, to provide the derivative output from amplifier AF, from where it is applied to a pair of comparator amplifiers AA and AB. Amplifier AA receives a bias voltage $+e_c$ on its non-inverting input terminal, and hence provides a positive output voltage whenever the amplifier AF output is more negative than $+e_c$, while amplifier AB receives a bias voltage $-e_c$ on its inverting input terminal, and hence provides a positive output voltage whenever the amplifier AF output is more positive than $-e_c$. The outputs from amplifiers are applied to and gate GA, which is thus enabled only when the derivative of the video signal is a value between $\pm e_c$. The output of gate GA is applied to each of a plurality of further AND gates G0A to G30A only three of which are shown. Each of the gates G0A to G30A also receives as its other input the output of a respective one of the gates G0 to G30 shown at the top of FIG. 1, and applies its output to a respective counter of the group partially shown at C0A to C30A. Thus whenever gate GA is enabled, indicating that the density gradient of the portion of the pattern being scanned falls within a given range of gradients, counts are accumulated in a respective counter, including the density of that portion falling within the given density gradient. Thus at the end of a scanning field the count in counter C0 will indicate the total area $A_0$ of the scan field falling within a given range $R_0$ of densities, and counter C0A will indicate how much of area $A_0$ has a density gradient falling within a selected range of density gradients. The bias voltages $\pm e_c$ applied to comparators AA and AB are preferably made variable, so that successive scans fields may be used to tally values in counters C0A to C31A for different ranges of density gradients. In FIG. 1 adjustment of potentiometer P1 determines the absolute levels of $\pm e_c$ and $-e_c$ voltages, while adjustment of potentiometer P2 determines the difference between them. If potentiometer P1 is adjusted to apply a small negative voltage to amplifier AG, a small positive voltage will be applied to comparator $e_c$ from amplifier AG. If potentiometer P2 is adjusted to a zero value, an equal voltage of opposite sign to that from amplifier AG will be applied to comparator AB from amplifier AH, so that gate GA will be enabled only by image portions having very small or zero density gradient. Using other adjustments of potentiometers P1 and P2 one may cause gate GA to be enabled for other ranges of density gradients having either positive or negative gradients.

While each of the accumulator devices C0 to C30 and C0A to C30A has been assumed to comprise a digital pulse counter, it is important to note that the gate outputs can instead be applied to operate respective switches which apply predetermined input voltages to respective analog integrators, to provide output data in the form of analog voltages rather than pulse counts. Such a modification is not in itself new, and is shown in the mentioned prior patent.

If desired, more time-sharing than that indicated in FIG. 1 may be provided. For example, as few as two comparators of the group A0–A31 may be provided together with one gate and one counter, and successive different pairs of reference voltages may be applied to the two such comparators as successive fields are scanned. As the original video signal is applied to the pair of comparators during a given field, the counter will tally the area of the scanned field which falls within a given density range. Such an arrangement is shown in the mentioned prior patent. However, when the derivative of the video signal is applied to the comparators during a scanning field, the counter will tally the area of the pattern having a density gradient falling within a given range of density gradients, providing data values not obtained with the systems of the patent. After each scanning field, whether it be one in which original video or differentiated video was processed, the count value tallied in the counter is read out to a storage device or an analyzing device (not shown), using conventional gating circuits (not shown).

In accordance with another feature of the present invention, the significant data made available for analysis of the pattern may be markedly increased, to almost whatever degree is deemed desirable, by quantizing the differentiated video as the pattern is scanned with plural mutually-differing scanning patterns or rasters, such as successive rasters oriented in mutually-different directions. It is important to note, in order to appreciate some marked advantages of the present invention over the systems of the prior patent, that if one uses the concept of the prior patent, wherein totals are tallied of elemental areas falling within given density ranges, scanning with a raster oriented in one direction would, except for noise and system limitations, provide exactly the same data values as would scanning with a raster oriented in a different direction, and thus use of differently-oriented scanning patterns would merely be wasteful of time or added required equipment. This concept is illustrated in simple form in FIG. **2*a* wherein a matrix of elemental areas are shown. A number within each elemental area indicates an assumed density for that elemental area, only four different density ranges being assumed for sake of simplicity. The matrix is assumed to be surrounded on all sides by background area having zero density. As the matrix is scanned by horizontal scan lines $H_1$ through $H_5$ and tallies are made in accordance with the prior system, the count values obtained at the end of the field will be proportional to 13,4,5 and 1 for density ranges 1 through 4, there being 13 elemental areas of density value 1, 4 elemental areas of density value 2, etc. If the matrix of elemental areas is instead scanned with successive vertical scan lines $V_1$ to $V_5$, it will be apparent that exactly the same data values of 13, 4, 5 and 1** would be obtained. In essence, the system of the prior patent, in merely totalizing density values, wholly ignores the order in which various elemental areas are scanned.

Now assume instead that one notes the change between successive density levels as the matrix is scanned. For example, as line $H_1$ is scanned from left to right, values of +1, +1, +1, 0, −1 and −2 are scanned, it being assumed as before that all values outside the matrix are zero. Thus horizontal scanning from left to right with lines $H_1$ to $H_5$ in succession provides the derivative values shown in FIG. **2*b*. The number of entries for each derivative value in FIG. 2*b*** is as follows:

| Derivative Value | −3 | −2 | −1 | 0 | +1 | +2 |
|---|---|---|---|---|---|---|
| Number of entries | 1 | 2 | 6 | 10 | 9 | 2 |

The fact that a larger number (six) of different counts results in FIG. **2*b*** than for the prior system is not particularly significant for comparing the systems since either system may divide the parameter which it quantizes into any desired number of ranges with equal facility. However, if derivative values are noted as the matrix is scanned with vertical scan lines, derivative values will be detected as shown in FIG. 2c. The number of derivative values for each derivative value in FIG. 2c is as follows:

| Derivative Value | −3 | −2 | −1 | 0 | +1 | +2 | +3 |
|---|---|---|---|---|---|---|---|
| Number of entries | 1 | 2 | 9 | 8 | 6 | 2 | 2 |

From a comparison of the numbers tallied for the derivative values for the two different directions of scanning, it will be apparent that different scanning directions provide different sets of data values, each set being characteristic of the scanned pattern. Thus in accordance with the invention the pattern may be scanned in a plurality of different directions, and the counts tallied for each direction representing the total number of elemental areas of the pattern having density gradients falling within respective ranges of density gradients. The number of differently-oriented successive scanning fields one uses may vary in different applications, of course, as may the angles between successive scanning rasters. The orientation of a scanning raster to different successive directions as successive fields are scanned may be accomplished very simply, for example, by connecting conventional sweep waveforms through a resolver to the camera deflection system, and rotating the resolver through a desired angular increment between the successive fields, using a conventional stepping motor, for example. Various known all-electronic raster rotation techniques may instead by used. Each raster is aligned at an angle (other than 0° or 180° to each other raster. Use of two rasters at 180° from each other is wasteful, since the values obtained from one raster will merely be the negative of the values obtained from the other raster. It is not necessary that conventional television raster scanning be used, although it ordinarily will be most convenient. Arcuate scanning patterns, such as those illustrated by FIG. 3a also may be used, or patterns of the nature illustrated by FIG. 3b wherein a triangular waveform (rather than a ramp with a fast reset) is assumed to provide line deflection. The scan lines in FIGS. 3a and 3b ordinarily will be close together so as to entirely cover the pattern, at least where fine detail is regarded to be important, and the scan lines in FIGS. 3a and 3b are shown displaced from each other solely for clarity of illustration. In each case the limits of the unblanked portion of the scanning field, which limits are shown by rectangles in FIGS. 3a and 3b, extend beyond the blood cell or similar pattern being scanned, so that the initial density level value of the original video signal at the beginning of each scan line represents background area. It is important to note that the successive scan fields need not always comprise similar sets of parallel lines merely re-oriented in different directions. For example, one field might use substantially straight scan lines in conventional television fashion, a second field use a set of curved lines like one set shown in FIG. 3a, a third field use a set of generally-similar curved lines having a different curvature, etc. Also, it is not necessary that a given scanning field include plural scan lines. One field may comprise a spiral scan line of gradually varying (preferably decreasing) radius which progresses in a clockwise or counterclockwise direction, for example. It is not absolutely necessary in a field using successive lines that successive lines all begin from a portion of the scan field containing background area. For example, one scan field may comprise a first set of radial lines emanating from a point which may be occupied by a portion of the item being scanned, as indicated by the solid lines in FIG. 3c, a second field may comprise a second set of radial lines emanating from the same point in different directions as indicated by the dashed lines in FIG. 3c, or they may radiate from a different point. Deflection systems for producing arcuate, spiral and radial scan lines are well known and need not be described in detail.

If one scans with switch S1 in its upper position, one obtains the same data as that provided by the system of the prior patent. If one then scans with switch S1 in its mid-position, one then will have provided twice the amount of data. If additional scannings are then made to occur in different directions or with differing scanning patterns, three times, four times, five times, etc., as much data as that provided by the system of the prior patent may be provided for use in analysis. In FIG. 1 switch S1 is shown as a simple mechanical switch and the stepping motor shown connected to be stepped by a push-button, but it will be readily apparent that electronic switching and automatic switching may be readily incorporated without departing from the invention. Also, while comparators AA,AB, gate GA and counters C0A to C31A are shown connected by switch S1 in FIG. 1 to be operative in only one switch position, it is important to recognize that they may be connected to be operated as each of a number of successive geometrically-different scanning patterns are scanned.

In a different embodiment partially illustrated in FIG. 4a, the camera video signal commensurate with optical density of the elemental area being scanned is applied to a variable time-constant circuit 18 shown as comprising a resistance R and a group of different filters. The camera is assumed to scan in television raster fashion with a predetermined line scan speed. As successive fields are scanned, different output signals from the variable time-constant circuit are selected by switch S3 for application to the quantizing signal-processor, of which only comparator amplifiers A30 and A31 are shown. When a field is scanned with switch S3 in the position shown, the counters will tally counts in the manner of the prior patent. When a field is scanned with switch S3 positioned to receive the output of high-pass filter F1, different data values will be tallied, providing data somewhat like that provided by the system of FIG. 1 when the differentiator output is processed, depending upon the time-constant of filter F1. Further different sets of data values may be provided by scanning further fields, with switch S3 positioned during respective fields to select the output of a low-pass filter F2, a band-pass filter F3, or a band-stop filter F4. Still further sets of data may be obtained by scanning further fields with switches S4 through S8 transferred to vary the transfer functions of the path through variable time-constant circuit 18. It will be apparent that, if desired, duplicate signal processors and counters may be provided so that the outputs from several or all of the paths may be processed during the same scanning field.

It will be apparent that the invention is not limited to scanning through a microscope, and may be used with cameras which directly scan microphotographs, X-ray film, or a variety of other items in which minute detail and areas of many differing optical densities occur. It also will be apparent that flying-spot scanners, or Nipkow disc scanners and the like may be used in lieu of a vidicon camera in various embodiments of the invention. Further, it is important to note that in some applications the scanner used may sense reflected light rather than transmitted light, and thus in the appended claims the term light-remissivity is used generically to mean either the transmittance or the reflectance of an elemental area of the object being scanned.

It will thus be seen that the objects set forth above, among those made apparent from the preceding description, are efficiently attained. Since certain changes may be made in carrying out the above method and in the constructions set forth without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. In apparatus for classifying a pattern comprised of elemental areas situated within a scanning field, said elemental areas having three or more different light-remissive levels, the combination of scanning means for optically scanning said field and said elemental areas of said pattern to derive a first electrical waveform having a parameter which varies in accordance with the light-remissive level of the elemental area being scanned at a given instant; means for differentiating said first electrical waveform to provide a second electrical waveform having a parameter which varies in accordance with the time rate of change of the light-remissivity of the elemental areas being scanned from instant to instant; signal-processor means responsive to said second electrical waveform for providing three or more groups of further signals, the signals of each group of said further signals being provided whenever the value of said second waveform lies between a respective pair of values defining a respective range of optical density gradients; and accumulator means for separately accumulating the signals of each of said groups to provide three or more stored data signals defining values of a function characteristic of said pattern.

2. The combination according to claim 1 having means for applying said first electrical waveform to said signal-processor means to derive groups of additional signals, the signals of each group of additional signals being provided whenever the value of said first electrical waveform lies between a respective pair of values defining a respective range of density values, said accumulator means being operable to separately accumulate the signals of each group of said additional signals.

3. The combination according to claim 2 having a plurality of further accumulator means; means for detecting when said second electrical waveform lies within a given range for providing a gating signal; and gating means responsive to said gating signal to apply said groups of additional signals to respective ones of said further accumulator means.

4. The combination according to claim 1 wherein said scanning means is operable to scan said field and said pattern with a plurality of successive scanning fields; said signal-processor means is operative to provide different ones of said groups of further signals during respective ones of said successive scanning fields, and said accumulator means is operative to accumulate said different ones of said groups of further signals during respective ones of said successive scanning fields.

5. The combination according to claim 1 wherein said scanning means is operable to scan said field and said pattern with a plurality of successive scanning fields having mutually-differing geometrical properties.

6. The combination according to claim 5 wherein said scanning means is operative to scan said field with a plurality of successive scanning fields each comprising a set of parallel scan lines, the direction of the scan lines of each field differing from those of the other fields.

7. The combination according to claim 1 wherein said means for differentiating comprises a first amplifier connected to receive said first electrical waveform and to receive an integrator output signal, and an integrator connected to integrate the output signal of said first amplifier to provide said integrator output signal.

8. The combination according to claim 1 having first and second comparator amplifiers each responsive to said second electrical waveform and a respective reference signal; and gate means connected to be operated by the output signals of said comparator amplifiers when said second electrical waveform lies within a range of values determined by said reference signals applied to said comparator amplifiers.

9. The combination according to claim 8 having means for varying said reference signals applied to said first and second comparator amplifiers.

10. A method of analyzing an object comprised of elemental areas situated within a scanning field which comprises the steps of optically scanning said field and said object with a first scanning pattern to derive a first electrical waveform having a parameter which varies in accordance with the light-remissive level of the elemental area being scanned at a given instant; modifying said first electrical waveform to provide a second electrical waveform having a parameter which varies in accordance with the time rate of change of the light-remissivity of the elemental areas being scanned from instant to instant; detecting the portions of said second electrical waveform which lie within each of a first plurality of three or more ranges of magnitude to provide three or more groups of further signals, the signals of each of said groups being provided whenever said parameter of said second electrical waveform lies within a respective one of said ranges; and separately accumulating each of said groups of further signals to provide stored data values characteristic of said object.

11. The method according to claim 10 which includes optically scanning said field and said pattern with a second scanning pattern geometrically differing from said first scanning pattern to derive a third electrical waveform; modifying said third electrical waveform to provide a fourth electrical waveform which varies in accordance with the time rate of change of said third electrical waveform; detecting the portions of said fourth electrical waveform which lie within each of a plurality of three or more ranges of magnitude to provide additional groups of further signals; and separately accumulating the further signals of each of said additional groups to provide further stored data values characteristic of said object.

12. The method according to claim 10 which includes the step of detecting the portions of said first electrical waveform which fall within each of a second plurality of three or more ranges of magnitude to provide additional groups of further signals, the signals of each additional group being provided whenever said first electrical waveform lies within a respective one of said ranges of magnitude; and separately accumulating said further signals of said additional groups when said second electrical waveform lies within a predetermined one of said ranges of magnitude of said first plurality.

13. In a method of analyzing a pattern comprised of elemental areas situated within a scanning field and having three or more light-remissive levels, the steps of scanning said pattern and said field to derive a first electrical waveform having a magnitude which varies in accordance with the light-remissivity of the elemental area being scanned at a given instant; modifying said first electrical waveform in accordance with a plurality of predetermined mutually-differing transfer functions to provide a plurality of further waveforms; measuring the portions of each of said further waveforms which lie within each of a plurality of three or more ranges; and separately totalizing for each of said further waveforms the portions which lie within each of said ranges, thereby to provide stored data values characteristic of said pattern.

14. The method according to claim 13 wherein said step of scanning comprises scanning said pattern with a plurality of successive scanning fields to derive said first electrical waveform during each of said fields and said step of modifying comprises modifying said first electrical waveform in accordance with different ones of said transfer functions during said successive fields to provide different ones of said further waveforms during said successive fields.

15. Apparatus for analyzing a pattern comprised of elemental areas situated within a scanning field and having three or more light-remissive levels, comprising, in combination: scanning means for optically scanning said pattern and said field to derive a first electrical waveform having a magnitude which varies in accordance with the light-remissivity of the elemental area being scanned at a given instant; a network means operative to modify said first electrical waveform in accordance with each of a plurality of predetermined transfer functions to provide a plurality of further electrical waveforms; means for measuring the portions of each of said further electrical waveforms which lie within each of a plurality of three or more ranges; and means for separately totalizing for each of said further waveforms the portions which lie within each of said ranges.

16. Apparatus according to claim 15 in which said network means comprises an electrical filter circuit.

17. Apparatus according to claim 16 in which said filter circuit comprises a high-pass filter.

18. Apparatus according to claim 16 in which said filter circuit comprises a low-pass filter.

19. Apparatus according to claim 16 in which said filter circuit comprises a band-pass filter.

20. Apparatus according to claim 16 in which said filter circuit comprises a band-stop filter.

* * * * *